United States Patent
Zhong et al.

(10) Patent No.: US 11,309,592 B2
(45) Date of Patent: Apr. 19, 2022

(54) LOAD POWER SUPPLY CIRCUIT AND TERMINAL

(71) Applicant: HUAWEI TECHNOLOGIES CO., LTD., Guangdong (CN)

(72) Inventors: Guanghua Zhong, Shenzhen (CN); Yuanguo Wang, Shanghai (CN); Ming Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/085,883

(22) PCT Filed: Mar. 25, 2016

(86) PCT No.: PCT/CN2016/077426
§ 371 (c)(1),
(2) Date: Sep. 17, 2018

(87) PCT Pub. No.: WO2017/161587
PCT Pub. Date: Sep. 28, 2017

(65) Prior Publication Data
US 2019/0115634 A1    Apr. 18, 2019

(51) Int. Cl.
*H01M 10/48* (2006.01)
*H01M 10/42* (2006.01)
(Continued)

(52) U.S. Cl.
CPC ............ *H01M 10/48* (2013.01); *G05F 1/577* (2013.01); *H01M 10/4207* (2013.01);
(Continued)

(58) Field of Classification Search
CPC .. H01M 10/48; H01M 10/42; H01M 10/4207; H02J 7/0029; H02M 1/08; H02M 3/33515; H02M 3/335; G05F 1/577
(Continued)

(56) References Cited

U.S. PATENT DOCUMENTS 6,118,254 A * 9/2000 Faulk .................... H02J 7/0068
                                                            320/128
6,329,786 B1 * 12/2001 Ono ....................... H02J 7/0044
                                                            320/113
(Continued)

FOREIGN PATENT DOCUMENTS

CN          1701482 A      11/2005
CN       201130906 Y       10/2008
(Continued)

OTHER PUBLICATIONS

Extended European Search Report issued in European Application No. 16894940.2 dated Feb. 1, 2019, 8 pages.
(Continued)

*Primary Examiner* — Richard Isla
*Assistant Examiner* — Dung V Bui
(74) *Attorney, Agent, or Firm* — Fish & Richardson P.C.

(57) ABSTRACT

Embodiments of the present invention relate to the battery monitoring field, and provide a load power supply circuit and a terminal. The load power supply circuit includes a charging manager and a step-up circuit. The charging manager includes a first pin, a second pin, and a third pin. The first pin of the charging manager is electrically connected to a load, and the second pin of the charging manager is electrically connected to a battery. The step-up circuit includes a first end, a second end, and a control end. The first end of the step-up circuit is electrically connected to the load, the second end of the step-up circuit is electrically connected to the battery, and the control end of the step-up circuit is electrically connected to the third pin of the charging manager.

10 Claims, 8 Drawing Sheets

(51) Int. Cl.
  *H02M 3/335* (2006.01)
  *H02M 1/08* (2006.01)
  *G05F 1/577* (2006.01)
  *H02J 7/00* (2006.01)
  *H02M 3/135* (2006.01)
  *H02M 3/156* (2006.01)
  *H02M 1/00* (2006.01)

(52) U.S. Cl.
  CPC ............ *H02J 7/0068* (2013.01); *H02M 1/08* (2013.01); *H02M 3/135* (2013.01); *H02M 3/156* (2013.01); *H02M 3/33515* (2013.01); *H02J 7/0029* (2013.01); *H02J 2207/20* (2020.01); *H02M 1/0087* (2021.05)

(58) Field of Classification Search
  USPC .......................................................... 320/132
  See application file for complete search history.

(56) References Cited

U.S. PATENT DOCUMENTS

| | | | |
|---|---|---|---|
| 9,048,676 B2* | 6/2015 | Tsuji | H02J 7/0068 |
| 9,214,824 B2* | 12/2015 | Masumoto | H02J 7/00 |
| 2001/0020802 A1* | 9/2001 | Kitagawa | H02J 7/34 |
| | | | 307/66 |
| 2006/0006850 A1 | 1/2006 | Inoue et al. | |
| 2007/0194626 A1* | 8/2007 | Eager | H02J 7/0068 |
| | | | 307/66 |
| 2008/0054855 A1 | 3/2008 | Hussain et al. | |
| 2009/0108677 A1 | 4/2009 | Walter et al. | |
| 2009/0124299 A1* | 5/2009 | Suzuki | H02J 7/00309 |
| | | | 455/573 |
| 2014/0032953 A1* | 1/2014 | Wei | G06F 1/3234 |
| | | | 713/323 |
| 2014/0203763 A1 | 7/2014 | Zhao et al. | |
| 2015/0002097 A1* | 1/2015 | Kung | H02J 7/0068 |
| | | | 320/128 |
| 2016/0064979 A1* | 3/2016 | Huang | H02J 7/0029 |
| | | | 320/114 |
| 2016/0087462 A1* | 3/2016 | Kudo | H02J 7/00 |
| | | | 320/162 |

FOREIGN PATENT DOCUMENTS

| | | |
|---|---|---|
| CN | 102088194 A | 6/2011 |
| CN | 103066666 A | 4/2013 |
| CN | 103825351 A | 5/2014 |
| FR | 2937195 A1 | 4/2010 |
| JP | 5692570 B2 | 4/2015 |
| TW | I501521 B | 9/2015 |

OTHER PUBLICATIONS

Office Action issued in Chinese Application No. 201680080771.3 dated Jun. 25, 2019, 13 pages.

International Search Report and Written Opinion issued in International Application No. PCT/CN2016/077426 dated Jan. 3, 2017, 20 pages.

EPO Communication under Rule 71(3) EPC issued in European Application No. 16894940.2 dated Sep. 14, 2021, 40 pages.

* cited by examiner

LOAD POWER SUPPLY CIRCUIT AND TERMINAL

CROSS-REFERENCE TO RELATED APPLICATIONS

This application is a national stage of International Application No. PCT/CN2016/077426, filed on Mar. 25, 2016, which is hereby incorporated by reference in its entirety.

TECHNICAL FIELD

The present invention relates to the battery monitoring field, and in particular, to a load power supply circuit and a terminal.

BACKGROUND

In design of a mobile communications terminal, a working voltage of a battery may be lower with development of a battery technology and application of a new material battery. A shutdown voltage of the battery may decrease to 2.7 V, and a shutdown voltage required by a load to which the battery supplies power may be from 3.3 V to 3.5 V. Consequently, electric power of the battery from 2.7 V to 3.3 V or from 2.7 V to 3.5 V cannot be used, resulting in a battery electric power waste.

SUMMARY

Embodiments of the present invention provide a load power supply circuit and a terminal, so as to make full use of electric power of a battery at a low voltage level without increasing system load.

According to a first aspect, a load power supply circuit is provided, and the load power supply circuit includes a charging manager and a step-up circuit;

the charging manager includes a first pin, a second pin, and a third pin, the first pin of the charging manager is electrically connected to a load, and the second pin of the charging manager is electrically connected to a battery; and the step-up circuit includes a first end, a second end, and a control end, the first end of the step-up circuit is electrically connected to the load, the second end of the step-up circuit is electrically connected to the battery, and the control end of the step-up circuit is electrically connected to the third pin of the charging manager; where when a voltage of the battery is greater than a first threshold, the charging manager controls a circuit between the first pin and the second pin of the charging manager to be connected, and the charging manager controls the control end of the step-up circuit to disconnect the step-up circuit, so that the battery supplies power to the load by using the charging manager; and when the voltage of the battery is less than a second threshold, the charging manager controls the circuit between the first pin and the second pin of the charging manager to be disconnected, and the charging manager controls the control end of the step-up circuit to connect the step-up circuit, so that the battery supplies power to the load by using the step-up circuit, where the second threshold is less than or equal to the first threshold.

The charging manager may be a charging management chip. The electrical connection in the present invention may be understood as a direct connection or an indirect connection using another component.

The charging manager is externally connected to the step-up circuit. When the voltage of the battery is greater than the first threshold, the voltage of the battery is at a medium-high voltage level and can support all components in the load in normal working, and therefore, the charging manager controls the step-up circuit to be disconnected, so that the battery supplies power to the load by using the charging manager. When the voltage of the battery is less than the second threshold, the battery is at a low voltage level and cannot support all the components in the load in normal working, and therefore, the charging manager enables the battery to stop supplying power to the load by using the charging manager. Instead, the step-up circuit is used to increase a voltage for supplying power to the load, so that all the components in the load can work normally by using the increased voltage. In this case, electric power of the battery at a low voltage level can be fully used.

In a possible design, the charging manager includes a logic control circuit and a switch element, the logic control circuit includes a first output end and a second output end, and the switch element includes a first end, a second end, and a control end;

the first end of the switch element is electrically connected to the first pin of the charging manager, the second end of the switch element is electrically connected to the second pin of the charging manager, and the control end of the switch element is electrically connected to the first output end of the logic control circuit; and the second output end of the logic control circuit is electrically connected to the third pin of the charging manager; where that when a voltage of the battery is greater than a first threshold, the charging manager controls a circuit between the first pin and the second pin of the charging manager to be connected, and the charging manager controls the control end of the step-up circuit to disconnect the step-up circuit, so that the battery supplies power to the load by using the charging manager is specifically:

when the voltage of the battery is greater than the first threshold, the logic control circuit controls the control end of the switch element to connect the first end and the second end of the switch element, and the logic control circuit controls the control end of the step-up circuit to disconnect the step-up circuit, so that the battery supplies power to the load by using the switch element in the charging manager; and that when the voltage of the battery is less than a second threshold, the charging manager controls the circuit between the first pin and the second pin of the charging manager to be disconnected, and the charging manager controls the control end of the step-up circuit to connect the step-up circuit, so that the battery supplies power to the load by using the step-up circuit, where the second threshold is less than or equal to the first threshold is specifically:

when the voltage of the battery is less than the second threshold, the logic control circuit controls the control end of the switch element to disconnect the first end and the second end of the switch element, and the logic control circuit controls the control end of the step-up circuit to connect the step-up circuit, so that the battery supplies power to the load by using the step-up circuit, where the second threshold is less than or equal to the first threshold.

Therefore, the step-up circuit and the switch element in the charging manager are connected in parallel to form a bypassboost circuit. The switch element is a bypass circuit, and the step-up circuit is a boost circuit. In comparison with the prior art in which the voltage of the battery at a high voltage level may decrease, or the provided bypass circuit may be disposed between the battery and the load or inside the battery, and a MOS transistor or both a MOS transistor and an inductor are generally disposed in the bypass circuit, in this application, the voltage of the battery at a medium-high voltage level does not need to be decreased to supply power to the load, and the existing switch element in the charging manager is used as the bypass circuit. In this way, working efficiency of the load can be improved, and direct current impedance caused by the MOS transistor and the inductor that are additionally disposed inside the battery or between the battery and the load can be avoided, thereby improving a loading capability of the battery.

In a possible design, the switch element is a metal insulator semiconductor MOS transistor; and a gate of the MOS transistor is the control end of the switch element, a source of the MOS transistor is the second end of the switch element, and a drain of the MOS transistor is the first end of the switch element.

In a possible design, when the charging manager is electrically connected to an external power supply, the external power supply supplies power to the load by using the charging manager, the logic control circuit controls the control end of the switch element to connect the first end and the second end of the switch element, and the external power supply charges the battery by using the switch element.

According to another aspect, a terminal is provided, and the terminal includes: a battery, a load, and a load power supply circuit. The battery supplies power to the load by using the load power supply circuit, and the load power supply circuit includes a charging manager and a step-up circuit.

A circuit design of the load power supply circuit is described in the first aspect, and details are not described herein again.

Therefore, when the terminal includes the load power supply circuit, electric power of the battery at a low voltage level can be fully used, thereby prolonging a standby time of the terminal.

In conclusion, according to the load power supply circuit and the terminal provided in the embodiments of the present invention, the charging manager is externally connected to the step-up circuit. When the voltage of the battery is greater than the first threshold, the voltage of the battery is at a medium-high voltage level and can support all components in the load in normal working, and therefore, the charging manager controls the step-up circuit to be disconnected, so that the battery supplies power to the load by using the charging manager. When the voltage of the battery is less than the second threshold, the battery is at a low voltage level and cannot support all the components in the load in normal working, and therefore, the charging manager enables the battery to stop supplying power to the load by using the charging manager. Instead, the step-up circuit is used to increase a voltage for supplying power to the load, so that all the components in the load can work normally by using the increased voltage. In this way, electric power of the battery at a low voltage level can be fully used.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An embodiment of the present invention provides a load power supply circuit, and the load power supply circuit may be applied to a terminal device. The terminal device may be a mobile terminal such as a mobile phone or a Pad, and the load power supply circuit is configured to supply power to a system load circuit in the terminal device.

Figure 1:
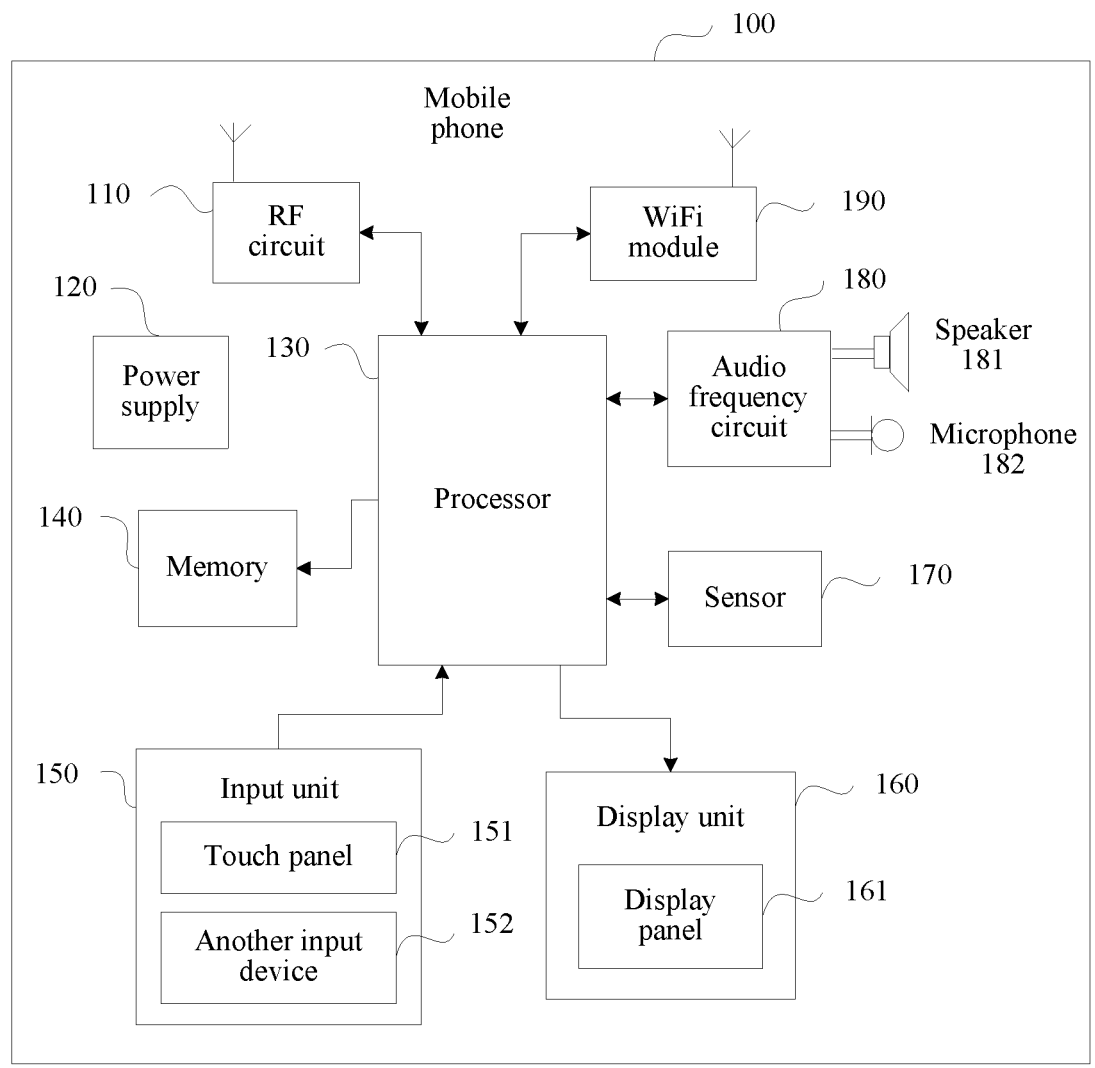
FIG. 1 is a block diagram of a partial structure of a mobile phone related to an embodiment of the present invention.

For example, the terminal device is a mobile phone. FIG. 1 is a block diagram of a partial structure of a mobile phone 100 related to an embodiment of the present invention. Referring to FIG. 1, the mobile phone 100 includes components such as a radio frequency (Radio Frequency, RF) circuit 110, a power supply 120, a processor 130, a memory 140, an input unit 150, a display unit 160, a sensor 170, an audio frequency circuit 180, and a Wireless Fidelity (Wireless Fidelity, WiFi) module 190. A person skilled in the art may understand that the structure of the mobile phone shown in FIG. 1 does not constitute any limitation on the mobile phone. The mobile phone may include more or fewer components than those shown in the diagram, or a combination of some components, or different component arrangements.

The following provides detailed description of all the components of the mobile phone 100 with reference to FIG. 1.

The RF circuit 110 may be configured to receive and send information, or to receive and send a signal in a call process. Particularly, after receiving downlink information of a base station, the RF circuit 110 sends the downlink information to the processor 130 for processing, and sends uplink data of the mobile phone to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device by means of wireless communication. Any communications standard or protocol may be used for the wireless communication, including but not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The memory 140 may be configured to store a software program and a module, and the processor 130 executes various functional applications of the mobile phone 100 and performs data processing by running the software program and the module stored in the memory 140. The memory 140 may mainly include a program storage area and a data storage area. The program storage area may store an operating system, an application program required by at least one function (such as an audio play function or an image display function), and the like. The data storage area may store data (such as audio data or a phonebook) created according to use of the mobile phone 100, and the like. In addition, the memory 140 may include a high-speed random access memory, and may further include a nonvolatile memory, such as at least one magnetic disk storage component, a flash memory component, or another volatile solid-state storage component.

The input unit 150 may be configured to: receive entered digits or character information, and generate key signal input related to a user setting and function control of the mobile phone 100. Specifically, the input unit 150 may include a touch panel 151 and another input device 152. The touch panel 151 is also referred to as a touchscreen, and may collect a touch operation of a user on or near the touch panel 151 (for example, an operation of the user on the touch panel 151 or near the touch panel 151 by using any proper object or accessory, such as a finger or a stylus), and drive a corresponding connection apparatus according to a preset program. Optionally, the touch panel 151 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into contact coordinates, and sends the contact coordinates to the processor 130, and can receive and execute a command sent by the processor 130. In addition, the touch panel 151 may be, for example, a resistive, capacitive, infrared, or surface acoustic touch panel. In addition to the touch panel 151, the input unit 150 may include the another input device 152. Specifically, the another input device 152 may include but is not limited to one or more of a physical keyboard, a function key (for example, a volume control key or an on/off key), a trackball, a mouse, an operating lever, or the like.

The display unit 160 may be configured to display information entered by the user or information provided for the user, and various menus of the mobile phone 100. The display unit 160 may include a display panel 161. Optionally, the display panel 161 may be configured by using an LCD, an OLED, or the like. Further, the touch panel 151 may cover the display panel 161. When detecting a touch operation on or near the touch panel 151, the touch panel 151 transfers the touch operation to the processor 130 to determine a type of a touch event, and then the processor 130 provides corresponding visual output on the display panel 161 according to the type of the touch event. Although the touch panel 151 and the display panel 151 in FIG. 1 are used as two independent parts to implement input and input functions of the mobile phone 100, in some embodiments, the touch panel 151 and the display panel 161 may be integrated to implement the input and output functions of the mobile phone 100.

The mobile phone 100 may further include at least one sensor 170, such as a light sensor, a motion sensor, or another sensor. Specifically, the light sensor may include an ambient light sensor and a proximity sensor. The ambient light sensor may adjust luminance of the display panel 161 according to brightness of ambient light, and the proximity sensor may close the display panel 161 and/or backlight when the mobile phone 100 approaches an ear. As a type of the motion sensor, an accelerometer sensor may detect acceleration values in all directions (generally three axes), may detect a value and a direction of gravity in a static mode, and may be applied to an application for identifying a mobile phone posture (for example, switching between landscape and portrait screens, a relevant game, and magnetometer posture calibration), a function related to vibration recognition (such as a pedometer or a knock), and the like. Other sensors such as a gyroscope, a barometer, a hygrometer, a thermometer, and an infrared sensor may be disposed on the mobile phone 100. Details are not described herein.

The audio frequency circuit 180, a speaker 181, and a microphone 182 may provide an audio interface between the user and the mobile phone 100. The audio frequency circuit 180 may convert received audio data into an electrical signal, and transmit the electrical signal to the speaker 181, and the speaker 181 converts the electrical signal into a sound signal for output. In addition, the microphone 182 converts a collected sound signal into an electrical signal, and the audio frequency circuit 180 receives the electrical signal, converts the electrical signal into audio data, and outputs the audio data to the RF circuit 110, so as to send the audio data to, for example, another mobile phone, or output the audio data to the memory 140 for further processing.

WiFi is a short-distance wireless transmission technology. The mobile phone 100 may use the WiFi module 190 to help the user receive and send an email, browse a web page, access streaming media, and the like. The WiFi module provides the user with wireless broadband Internet access. Although FIG. 1 shows the WiFi module 190, it can be understood that the WiFi module is not a mandatory part of the mobile phone 100, and may be omitted as required without changing the scope of the essence of the present invention.

The processor 130 is a control center of the mobile phone 100, and uses various interfaces and lines to connect all parts of the entire mobile phone. By running or executing a software program and/or a module stored in the memory 140 and invoking data stored in the memory 140, the processor 130 executes various functions of the mobile phone 100 and processes data, so as to implement various services based on the mobile phone. Optionally, the processor 130 may include one or more processing units. Preferably, an application processor and a modem processor may be integrated into the processor 130. The application processor mainly processes an operating system, a user interface, an application program, and the like, and the modem processor mainly processes wireless communication. It can be understood that the modem processor may not be integrated into the processor 130.

The mobile phone 100 further includes the power supply 120 (such as a battery) that supplies power to each component. Preferably, the power supply may be logically connected to the processor 130 by using a load power supply circuit. In this way, functions such as charging management, discharging management, and power consumption management are implemented by using the load power supply circuit.

Although not shown, the mobile phone 100 may further include a camera, a Bluetooth module, and the like. Details are not described herein.

Figure 2:
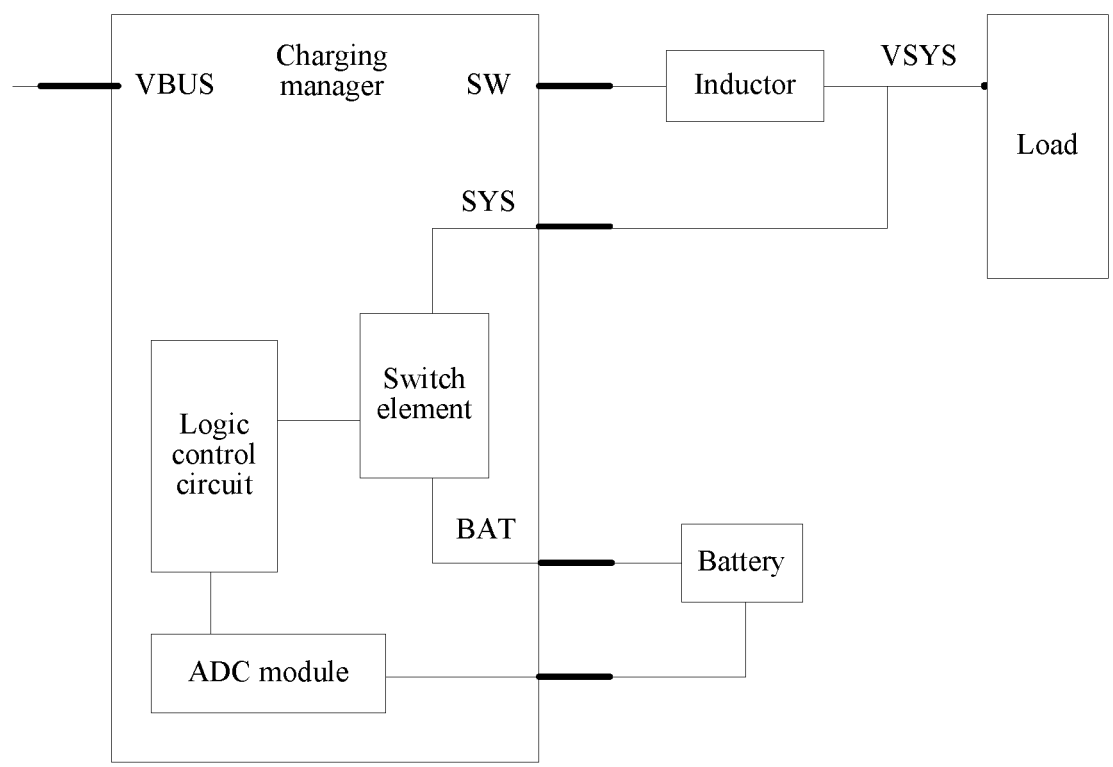
FIG. 2 is a circuit design diagram in which a load power supply circuit is connected to a battery.

FIG. 2 is a circuit design diagram in which a load power supply circuit is connected to a battery. The load power supply circuit may include a charging manager. The charging manager includes an analog-to-digital converter (Analog-to-Digital Converter, ADC) module, a logic control circuit, a switch element, and the like. The charging manager is configured to control charging and discharging of a battery in a terminal. When the terminal is being charged, the charging manager is configured to control an external power supply to charge the battery. When the terminal is being discharged, the battery supplies power to a load by using a charging management chip. The ADC module may collect a voltage of the battery in a charging/discharging process and transmit the voltage to the logic control circuit, so that a logic control module controls a charging process of the battery, thereby avoiding a battery short circuit, undercharging, overcharging, and the like.

Specifically, when the terminal is in a charging state, a charging path of the terminal is as follows: A power supply current of the external power supply flows into the charging manager by using a VBUS pin, and is output to a VSYS end by using an SW pin and an inductor, so as to supply power to the load. The VSYS end is connected to an SYS pin of the charging manager, the SYS pin is connected to a BAT pin by using the switch element, and the BAT pin is connected to the battery. Therefore, a current that is from the external power supply and passes through the VSYS end passes through the charging manager and is shunted to the battery, so as to charge the battery. When the terminal is in a discharging state, a discharging path of the battery is as follows: A discharging current of the battery flows from the BAT pin of the charging manager to the switch element and arrives at the SYS pin, and then flows from the SYS pin to the VSYS end to supply power to the load. It can be learned that the switch element is two-way connected. Generally, the switch element is always in a steady-on state when the battery is in a charging state or a discharging state.

In the present invention, the load power supply circuit is improved to make full use of electric power of the battery at a low voltage level without increasing system load.

Figure 3:
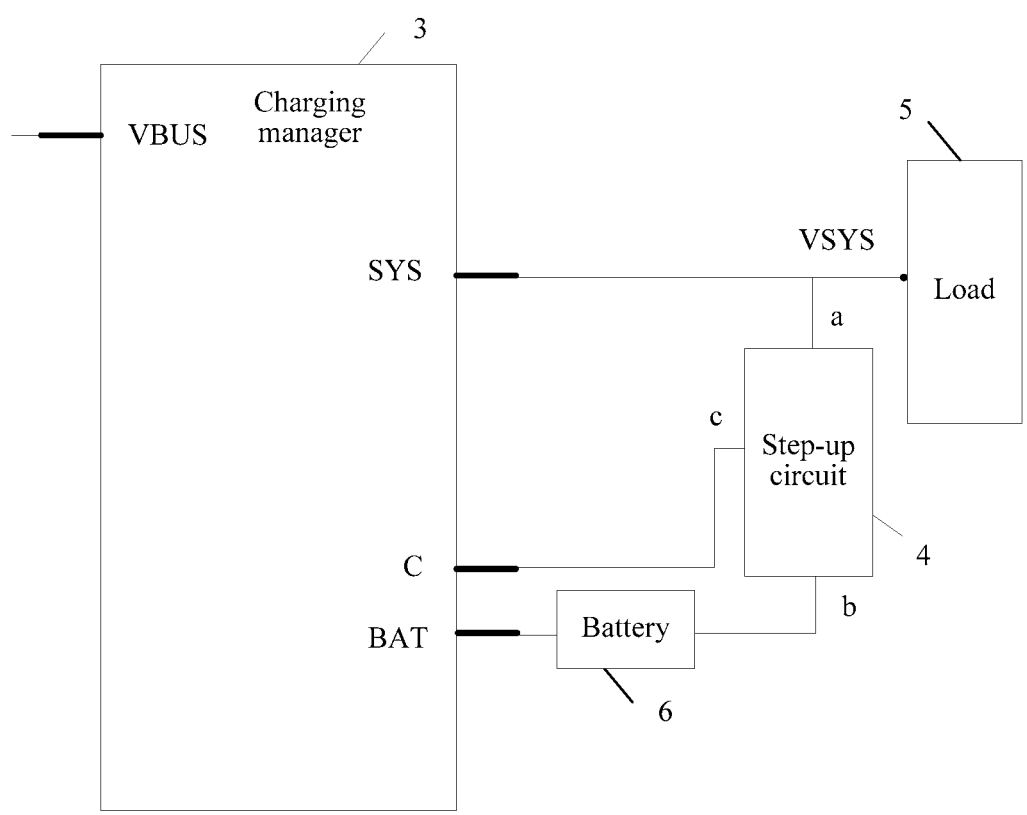
FIG. 3 is a circuit design diagram of a load power supply circuit according to an embodiment of the present invention.

FIG. 3 is a circuit design diagram of a load power supply circuit according to an embodiment of the present invention. The load power supply circuit is an improvement to the load power supply circuit that includes the charging manager and that is shown in FIG. 2. In the circuit shown in FIG. 3, the load power supply circuit includes a charging manager 3 and a step-up circuit 4. The charging manager 3 includes a first pin SYS, a second pin BAT, and a third pin C. The first pin SYS of the charging manager 3 is electrically connected to a load 5, and the second pin BAT of the charging manager 3 is electrically connected to a battery 6.

The step-up circuit 4 includes a first end a, a second end b, and a control end c, the first end a of the step-up circuit 4 is electrically connected to the load 5, the second end b of the step-up circuit 4 is electrically connected to the battery 6, and the control end c of the step-up circuit 4 is electrically connected to the third pin C of the charging manager 3.

When a voltage of the battery 6 is greater than a first threshold, the charging manager 3 controls a circuit between the first pin SYS and the second pin BAT of the charging manager 3 to be connected, and the charging manager 3 controls the control end c of the step-up circuit 4 to disconnect the step-up circuit 4, so that the battery 6 supplies power to the load 5 by using the charging manager 3.

When the voltage of the battery 6 is less than a second threshold, the charging manager 3 controls the circuit between the first pin SYS and the second pin BAT of the charging manager 3 to be disconnected, and the charging manager 3 controls the control end c of the step-up circuit 4 to connect the step-up circuit 4, so that the battery 6 supplies power to the load 5 by using the step-up circuit 4, where the second threshold is less than or equal to the first threshold.

The charging manager 3 may be a charging management chip, for example, a BQ25892 charging management chip produced by Texas Instruments and an HI6521V200 charging management chip produced by Huawei Hisilicon. The electrical connection in the present invention may be understood as a direct connection or an indirect connection using another component.

It can be learned that the charging manager 3 is externally connected to the step-up circuit 4. When the voltage of the battery 6 is greater than the first threshold, for example, the first threshold is 3.4 V, it can be understood that the voltage of the battery 6 is at a medium-high voltage level and can support all components in the load 5 in normal working, and therefore, the charging manager 3 controls the step-up circuit 4 to be disconnected, so that the battery 6 supplies power to the load by using the charging manager 3. When the voltage of the battery 6 is less than the second threshold, for example, the second threshold is less than or equal to 3.4 V, it can be understood that the voltage of the battery 6 is at a low voltage level and cannot support all the components in the load 5 in normal working, and therefore, the charging manager 3 enables the battery to stop supplying power to the load 5 by using the charging manager 3. Instead, the step-up circuit 4 is used to increase a voltage for supplying power to the load 5, so that all the components in the load 5 can work normally by using the increased voltage. In this way, electric power of the battery at a low voltage level can be fully used.

Figure 4:
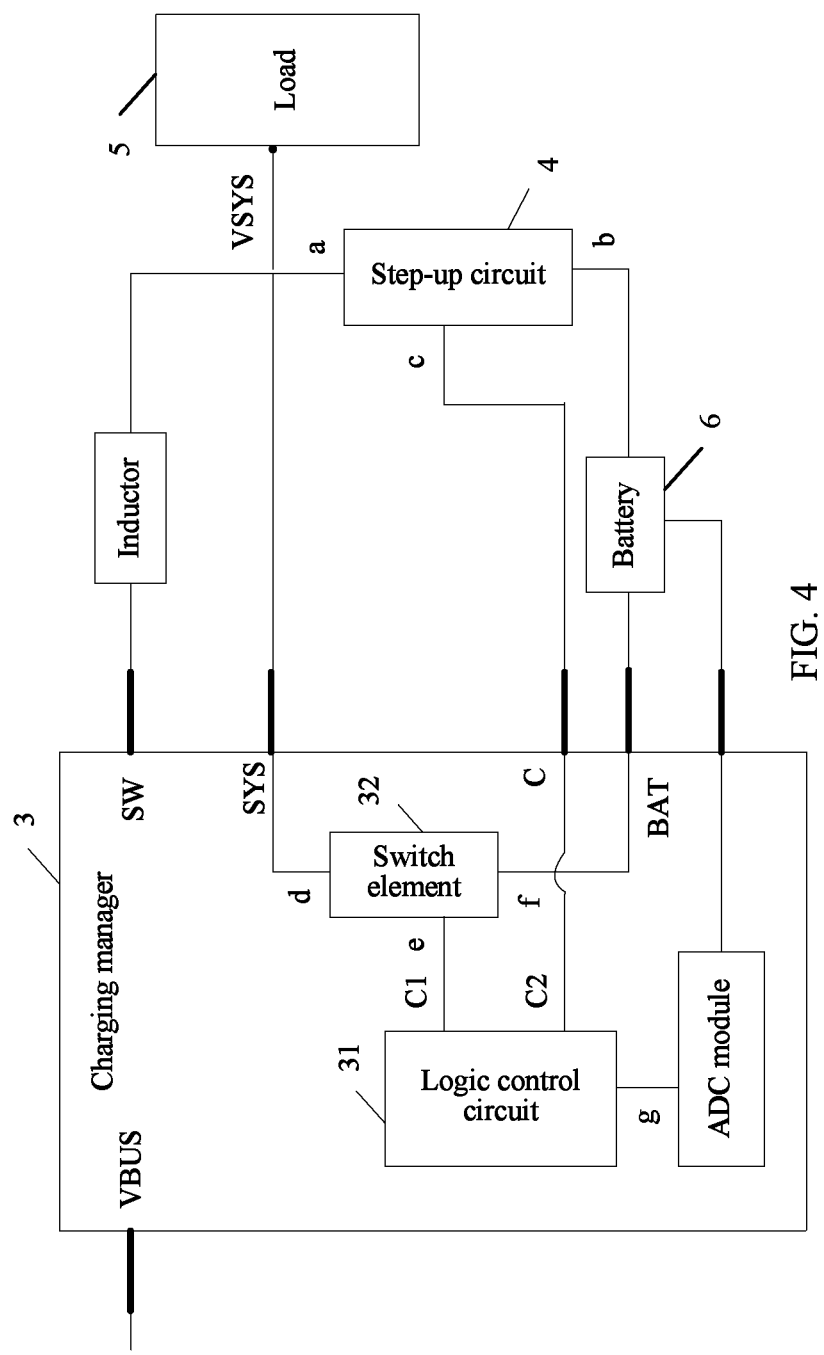
FIG. 4 is a circuit design diagram that is of a load power supply circuit and that includes an internal circuit design of a charging manager according to an embodiment of the present invention.

Further, FIG. 4 is a circuit design diagram that is of a load power supply circuit and that includes an internal circuit design of the charging manager 3 according to an embodiment of the present invention. FIG. 4 may be a specific implementation of FIG. 3. The charging manager 3 may include a logic control circuit 31 and a switch element 32, the logic control circuit 31 includes a first output end C1 and a second output end C2, and the switch element 32 includes a first end d, a second end f, and a control end e.

The first end d of the switch element 32 is electrically connected to the first pin SYS of the charging manager 3, the second end f of the switch element 32 is electrically connected to the second pin BAT of the charging manager 3, and the control end of the switch element 32 is electrically connected to the first output end C1 of the logic control circuit 31.

The second output end C2 of the logic control circuit 31 is electrically connected to the third pin C of the charging manager 3.

That when a voltage of the battery 6 is greater than a first threshold, the charging manager 3 controls a circuit between the first pin SYS and the second pin BAT of the charging manager 3 to be connected, and the charging manager 3 controls the control end c of the step-up circuit 4 to disconnect the step-up circuit 4, so that the battery 6 supplies power to the load 5 by using the charging manager 3 may be specifically:

when the voltage of the battery 6 is greater than the first threshold, the logic control circuit 31 controls the control end e of the switch element 32 to connect the first end d and the second end f of the switch element 32, and the logic control circuit 31 controls the control end c of the step-up circuit 4 to disconnect the step-up circuit 4, so that the battery 6 supplies power to the load 5 by using the switch element 32 in the charging manager 3.

That when the voltage of the battery 6 is less than a second threshold, the charging manager 3 controls the circuit between the first pin SYS and the second pin BAT of the charging manager to be disconnected, and the charging manager 3 controls the control end c of the step-up circuit 4 to connect the step-up circuit 4, so that the battery 6 supplies power to the load 5 by using the step-up circuit 4, where the second threshold is less than or equal to the first threshold may be specifically:

when the voltage of the battery 6 is less than the second threshold, the logic control circuit 31 controls the control end e of the switch element 32 to disconnect the first end d and the second end f of the switch element 32, and the logic control circuit 31 controls the control end c of the step-up circuit 4 to connect the step-up circuit 4, so that the battery 6 supplies power to the load 5 by using the step-up circuit 4, where the second threshold is less than or equal to the first threshold.

As shown in FIG. 4, the logic control circuit 31 may further include an input end g, and the logic control circuit 31 obtains the voltage of the battery 6 by using the input end g.

For example, the charging manager 3 further includes an analog-to-digital converter (Analog-to-digital converter, ADC) module. The ADC module is electrically connected to the battery 6 by using a pin D of the charging manager 3, and is configured to collect the voltage of the battery 6 and transmit the voltage to the logic control circuit 31, so that the logic control circuit 31 controls connection and disconnection of the switch element 32 and the step-up circuit 4 according to the collected voltage of the battery.

It can be learned that the step-up circuit 4 and the switch element 32 in the charging manager 3 are connected in parallel to form a bypassboost circuit. The switch element 32 is a bypass circuit, and the step-up circuit 4 is a boost circuit.

The bypassboost circuit is a circuit with two functions: a bypass state and a boost state. According to the load power supply circuit in this application, when the voltage of the battery 6 is greater than a specified lowest output voltage, that is, the first threshold, for example, 3.4 V, the load power supply circuit is in a bypass state, that is, the battery 6 supplies power to the load 5 by using the connected switch element 32. In this case, the step-up circuit 4 is not connected, and the boost circuit is in a cut-off state. When the voltage of the battery 6 is less than or equal to a specified lowest output voltage, that is, the second threshold, the load power supply circuit is in a boost state, and an output voltage of the load power supply circuit needs to be increased to the specified lowest output voltage, so that all the components in the load 5 can work normally. In this case, the switch element 32 is not connected, and the bypass circuit is in a cut-off state.

Figure 5:
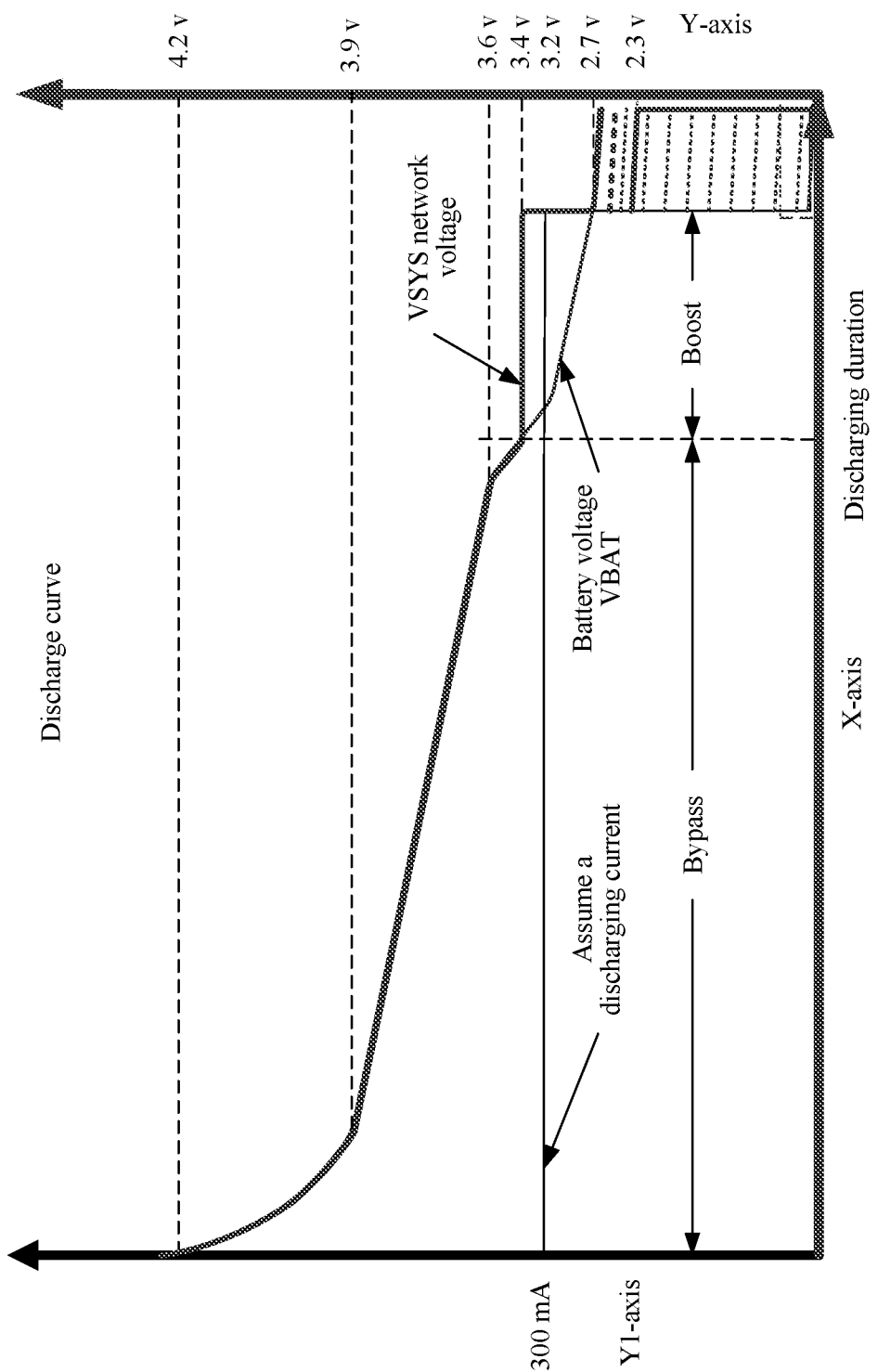
FIG. 5 is a discharge curve diagram obtained when a battery is in a discharging state according to an embodiment of the present invention.

FIG. 5 is a discharge curve diagram obtained when the battery 6 is in a discharging state according to an embodiment of the present invention, and the circuit design in FIG. 4 is used as an example for description. An X-axis in FIG. 5 represents discharging duration of the battery 6, a Y-axis represents an output voltage VSYS of the load power supply circuit, and a Y1-axis represents a current of the battery 6. When the battery 6 has sufficient electric power and the voltage is at a medium-high voltage level, for example, from 3.4 V to 4.2 V, the battery 6 may supply power to the load 5 by using the switch element 32, that is, the bypass circuit. The voltage of the battery 6 is the output voltage VSYS of the load power supply circuit, and the current of the battery 6 keeps unchanged, for example, 300 mA. When the voltage of the battery 6 is at a low voltage level, for example, the voltage is less than or equal to 3.4 V and reaches a shutdown voltage of the load, to enable all the components in the load 5 to work normally, the battery 6 may increase the output voltage VSYS of the load power supply circuit to, for example, 3.4 V, by using the step-up circuit 4, that is, the boost circuit, so as to normally supply power to the load 5 till electric power of the battery 6 exhausts. For example, a battery protection voltage of the battery 6 is 2.7 V, that is, a terminal is shut down when the voltage of the battery is lower than 2.7 V. In this case, electric power of the battery 6 at a low voltage level can be fully used when the voltage of the battery ranges from the shutdown voltage 2.7 V of the battery 6 to the shutdown voltage 3.4 V of the load.

Further, in comparison with the prior art in which the voltage of the battery at a high voltage level may decrease, or the provided bypass circuit may be disposed between the battery and the load or inside the battery, and a MOS transistor or both a MOS transistor and an inductor are generally disposed in the bypass circuit, in this application, the voltage of the battery at a medium-high voltage level does not need to be decreased to supply power to the load, and the existing switch element in the charging manager is used as the bypass circuit. In this way, working efficiency of the load can be improved, and direct current impedance caused by the MOS transistor and the inductor that are additionally disposed inside the battery or between the battery and the load can be avoided, thereby improving a loading capability of the battery.

Figure 6:
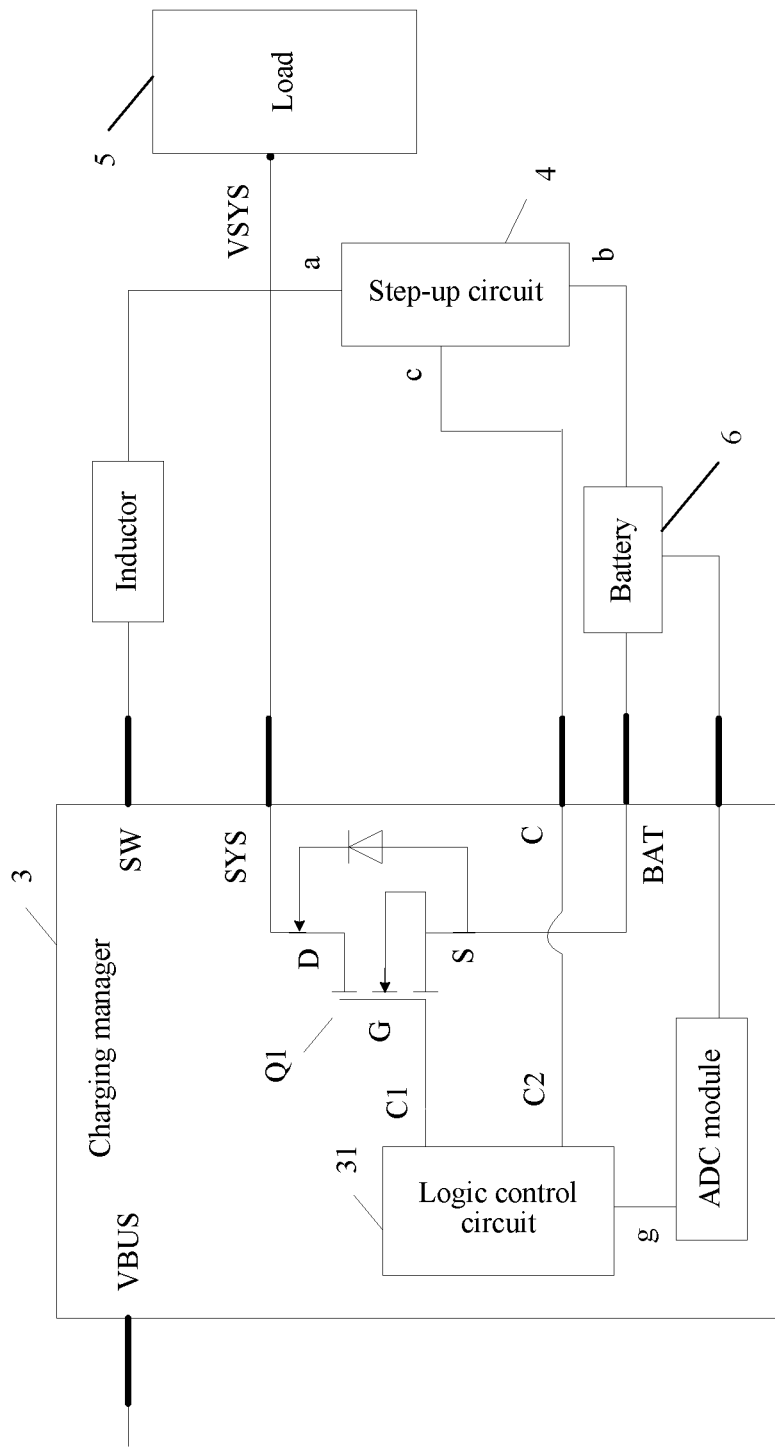
FIG. 6 is another circuit design diagram that is of a load power supply circuit and that includes an internal circuit design of a charging manager according to an embodiment of the present invention.

FIG. 6 is a circuit design diagram that is of another load power supply circuit and that includes an internal circuit design of the charging manager 3. The circuit design in FIG. 6 may be an implementation of the circuit design in FIG. 3 or 4. The switch element 32 inside the charging manager 3 may be a MOS transistor or a combination of a MOS transistor and a diode. For example, the switch element 32 is a MOS transistor. As shown in FIG. 6, a gate G of a MOS transistor Q1 is the control end e of the switch element 32, a source S of the MOS transistor Q1 is the second end f of the switch element 32, and a drain D of the MOS transistor Q1 is the first end d of the switch element 32.

In this case, when the voltage of the battery 6 is greater than the first threshold, the logic control circuit 31 controls the gate G of the MOS transistor Q1 to connect the source S and the drain D of the MOS transistor Q1, and the logic control circuit 31 controls the control end c of the step-up circuit 4 to disconnect the step-up circuit 4, so that the battery 6 supplies power to the load 5 by using the MOS transistor Q1 in the charging manager 3. When the voltage of the battery 6 is less than the second threshold, the logic control circuit 31 controls the gate G of the MOS transistor Q1 to disconnect the source S and the drain D of the MOS transistor Q1, and the logic control circuit 31 controls the control end c of the step-up circuit 4 to connect the step-up circuit 4, so that the battery 6 supplies power to the load 5 by using the step-up circuit 4.

When the charging manager 3 is electrically connected to an external power supply, the external power supply supplies power to the load 5 by using the charging manager 3, the logic control circuit 31 controls the control end c of the switch element 32 to connect the first end d and the second end f of the switch element 32, and the external power supply charges the battery by using the switch element 32.

In addition, when the charging manager 3 is electrically connected to the external power supply, and the voltage of the battery 6 is greater than a third threshold, the external power supply supplies power to the load by using the charging manager 3, and the logic control circuit 31 may control the control end e of the switch element 32 to disconnect the first end d and the second end f of the switch element 32. The third threshold is greater than the first threshold. For example, the first threshold is 3.6 V and the third threshold is 4.2 V. When the battery 6 is in a charging state, if the voltage of the battery 6 is greater than 4.2 V, to protect components in the battery 6 and the load 5, the logic control circuit 31 in the charging manager 3 may control the control end e of the switch element 32 to disconnect the switch element 32, so that the battery 6 stops supplying power to the load 5.

The charging manager 3 and the step-up circuit 4 may be integrated into a same circuit chip or not integrated into a same circuit chip.

Figure 7:
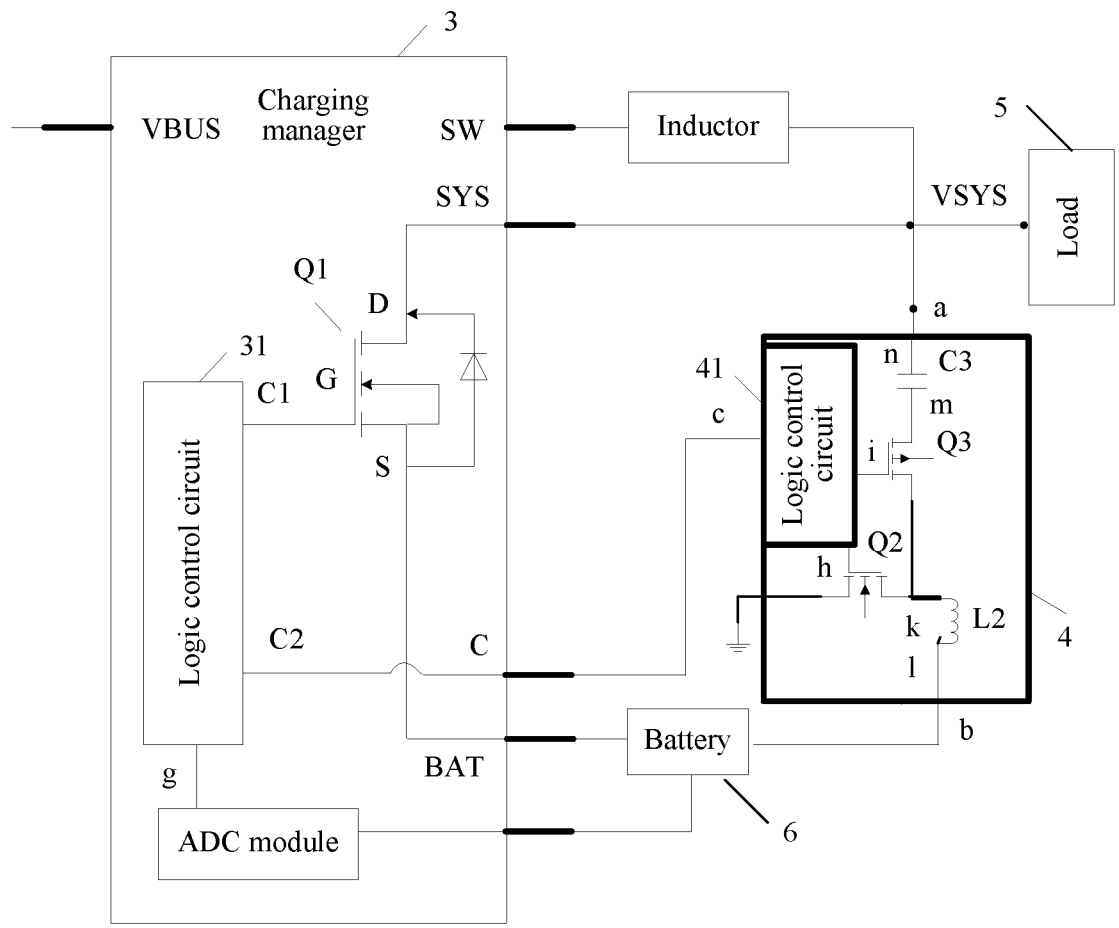
FIG. 7 is a circuit design diagram that includes an internal design of a step-up circuit according to an embodiment of the present invention.

FIG. 7 is a circuit design diagram that includes an internal design of the step-up circuit 4 according to an embodiment of the present invention. The step-up circuit 4 in FIG. 7 may be an implementation of the step-up circuit in FIG. 3, FIG. 4, or FIG. 6. The step-up circuit may be implemented in multiple manners, and this is not limited in this application. In a possible design, the step-up circuit 4 includes a logic control circuit 41, a MOS transistor Q2, a MOS transistor Q3, an inductor L2, and a capacitor C3. A first end c of the logic control circuit 41 is connected to an end C2 of the logic control circuit 31, a second end h of the logic control circuit 41 is connected to a gate of the MOS transistor Q2, and a third end i of the logic control circuit 41 is connected to a gate of the MOS transistor Q3. A drain of the MOS transistor Q3 is connected to a first end m of the capacitor C3, and a source of the MOS transistor Q3 is connected to a first end k of the inductor L2. A drain of the MOS transistor Q2 is connected to the first end k of the inductor L2, a second end l of the inductor L2 is connected to a battery, and a second end n of the capacitor C3 is connected to an output end VSYS of a load power supply circuit.

It can be learned from the foregoing description that, according to the load power supply circuit provided in the present invention, the charging manager and the step-up circuit may be used to make full use of electric power of the battery at a low voltage level. Further, the existing switch element in the charging manager and the step-up circuit are connected in parallel to form a bypassboost circuit, so as to make full use of electric power of the battery at a low voltage level without increasing system load.

The present invention further provides a terminal. The terminal includes a battery, a load, and a load power supply circuit. The battery supplies power to the load by using the load power supply circuit. The load power supply circuit includes a charging manager and a step-up circuit. For circuit implementations of the load power supply circuit, refer to the description in FIG. 2 to FIG. 7. Details are not described herein again.

Therefore, when the terminal includes the load power supply circuit, electric power of the battery at a low voltage level can be fully used, thereby prolonging a standby time of the terminal.

Figure 8:
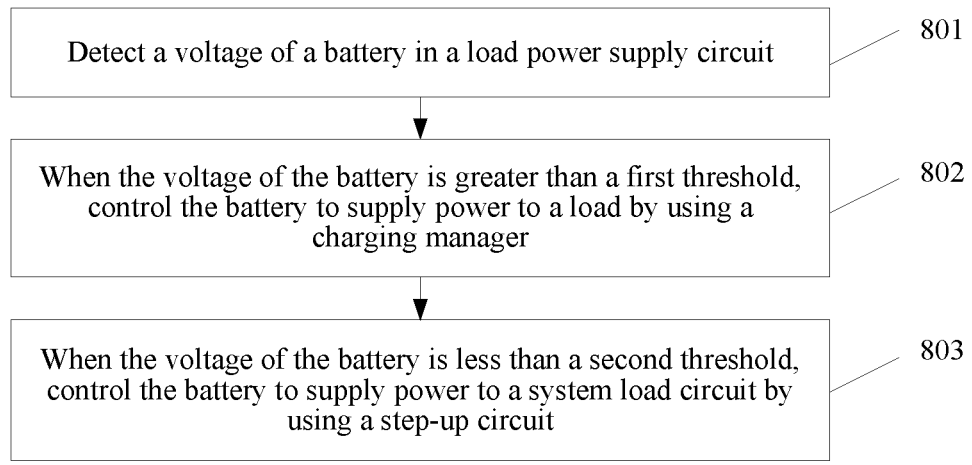
FIG. 8 is a schematic flowchart of a load power supply method according to an embodiment of the present invention.

FIG. 8 is a schematic flowchart of a load power supply method according to an embodiment of the present invention. The method may be applied to any load power supply circuit provided in the present invention. The method includes the following steps.

801. Detect a voltage of a battery in a load power supply circuit.

A logic control circuit in a charging manager may detect the voltage of the battery in the load power supply circuit in real time.

802. When the voltage of the battery is greater than a first threshold, control the battery to supply power to a load by using a charging manager.

For example, when the first threshold is 3.4 V, that is, the voltage of the battery is at a medium-high level, the charging manager controls a circuit between a first pin SYS and a second pin BAT of the charging manager to be connected. For example, if a switch element is disposed between the first pin SYS and the second pin BAT, the switch element is connected. In addition, the charging manager controls a step-up circuit to be cut off, so that the battery supplies power to the load by using the charging manager. For example, when the switch element is a MOS transistor Q1 in the charging manager, the logic control circuit 31 in the charging manager controls the MOS transistor Q1 to be connected, and the logic control circuit 31 controls the step-up circuit to be disconnected, so that the battery supplies power to the load by using the MOS transistor Q1. The MOS transistor Q1 is equivalent to an electronic switch.

803. When the voltage of the battery is less than a second threshold, control the battery to supply power to a system load circuit by using a step-up circuit.

For example, the second threshold may be 3.4 V, that is, the voltage of the battery is at a low voltage level. To ensure normal working of a component in the load, in FIG. 7, the logic control circuit controls the MOS transistor Q1 to be cut off, and the logic control circuit controls the step-up circuit to be connected, so that the battery increases an output voltage of the load power supply circuit by using the step-up circuit, so as to supply power to the system load.

Therefore, the step-up circuit and the MOS transistor Q1 in the charging manager form a bypassboost circuit that can supply power to the load according to the voltage of the battery by means of dynamic switching. A switching condition and a switching moment may be controlled by the logic control circuit in the charging manager.

Specifically, in FIG. 7, the logic control circuit 31 in the charging manager may be preset in a form of hardware or a software program, so that when detecting the voltage of the battery, the logic control circuit 31 switches, according to a comparison between the voltage of the battery and each of the first threshold and the second threshold, between supplying power to the load by using the step-up circuit and supplying power to the load by using the MOS transistor Q1 by the battery. A logic truth table of the logic control circuit 31 in the charging manager and corresponding description are shown in the following Table 1.

TABLE 1

| Status | C1 | C2 |
|---|---|---|
| Discharging, medium-high battery voltage | 1 | 0 |
| Discharging, low battery voltage | 0 | 1 |
| Charging | x | 0 |

C1 represents a switch control signal of the MOS transistor Q1, and C2 represents a switch control signal of the step-up circuit. When a logic truth of C1 is set to 1, it indicates that the MOS transistor Q1 in the charging manager is connected. When the logic truth of C1 is set to 0, it indicates that the MOS transistor Q1 is cut off. Therefore, when the logic control circuit 31 in the charging manager detects that the voltage of the battery is at a medium-high voltage level, the logic truth of C1 of the logic control circuit 31 in the charging manager is set to 1, and a logic truth of C2 is set to 0. When the logic truth of C2 is set to 1, it indicates that the step-up circuit is connected, and when the logic truth of C2 is set to 0, it indicates that the step-up circuit is disconnected. Therefore, when the logic control circuit 31 in the charging manager detects that the voltage of the battery is at a low voltage level, the logic truth of C1 of the logic control circuit in the charging manager is set to 0, and the logic truth of C2 is set to 1.

When a terminal is in a charging state, the MOS transistor Q1 in the charging manager needs to be connected, the logic truth of C1 is x, and the logic truth of C2 is 0. A current passes through a VBUS pin, an SW pin, and an inductor to supply power to the load. A part of the current passes through an SYS pin of the charging manager, the connected MOS transistor Q1, and the BAT pin to charge the battery. The logic truth x of C1 changes with the voltage of the battery in charging.

Figure 9:
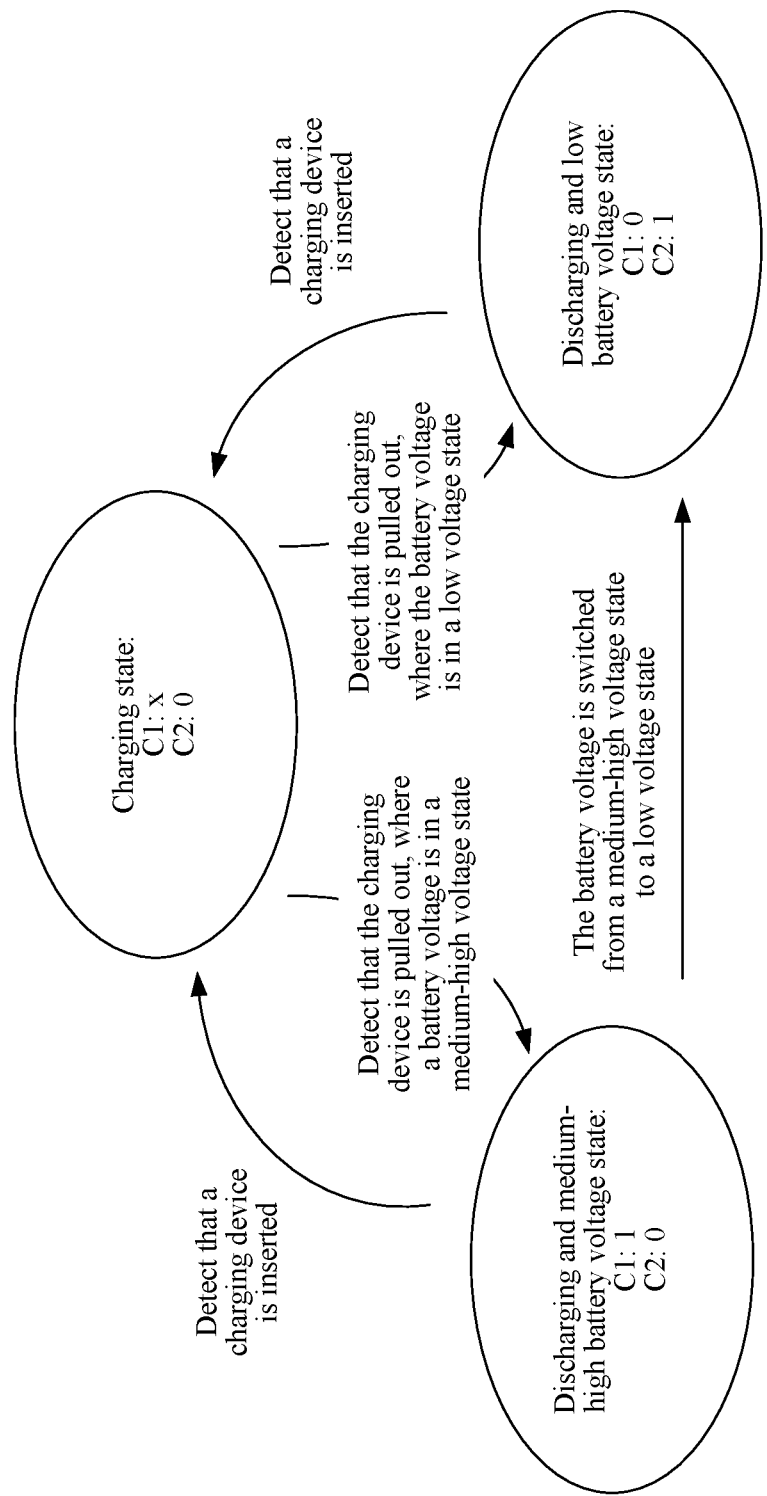
FIG. 9 is a schematic diagram that is of truth conversion of a MOS transistor Q1 and that is obtained when a battery is switched between a charging state and a discharging state according to an embodiment of the present invention.

FIG. 9 is a schematic diagram that is of truth conversion of the MOS transistor Q1 and that is obtained when the battery is switched between a charging state and a discharging state. As shown in FIG. 9, when the battery is in a discharging state and the voltage is in a medium-high voltage state, the logic truth of C1 is 1, and the MOS transistor Q1 is connected; the logic truth of C2 is 0, and the step-up circuit is disconnected. With consumption of battery electric power, when the voltage of the battery is switched from a medium-high voltage state to a low voltage state, the step-up circuit needs to be connected, the MOS transistor Q1 needs to be cut off, the logic truth of C1 is 0, and the logic truth of C2 is 1. If the battery is in a discharging state and the voltage is in a medium-high voltage state, when it is detected that a charging device is inserted into the terminal, that is, the terminal is in a charging state, the logic truth of C1 is x, and the MOS transistor Q1 is connected; the logic truth of C2 is 0, and the step-up circuit is disconnected. On the contrary, if the battery is in a charging state and the voltage of the battery is at a medium-high voltage level, when it is detected that the charging device is pulled out, the logic truth of C1 is 1, and the MOS transistor Q1 is connected; the logic truth of C2 is 0, and the step-up circuit is disconnected. If the battery is in a discharging state and the voltage of the battery is in a low voltage state, when it is detected that the charging device is inserted into the terminal, that is, the terminal is switched to a charging state, the logic truth of C1 is x, and the MOS transistor Q1 is connected; the logic truth of C2 is 0, and the step-up circuit is disconnected. On the contrary, if the battery is in a charging state and the voltage of the battery is in a low voltage state, when it is detected that the charging device is pulled out, the step-up circuit needs to be connected, the MOS transistor Q1 needs to be cut off, the logic truth of C1 is 0, and the logic truth of C2 is 1.

When a circuit of the step-up circuit is shown in FIG. 7, if the voltage of the battery is at a low voltage level, that is, when the MOS transistor Q1 in the charging manager is cut off and the step-up circuit is connected, the logic control circuit 41 in the step-up circuit controls the grounding MOS transistor Q2 to be connected and another MOS transistor Q3 to be cut off. In this way, after electric power of the battery is stored in the inductor L2, a current of the inductor L2 increases, and then the logic control circuit 41 controls the MOS transistor Q2 to be cut off and the MOS transistor Q3 to be connected. The electric power stored in the inductor is transmitted to the capacitor C3, so as to obtain the output voltage of the load power supply circuit by adding a voltage of the capacitor C3 to the voltage of the battery, so that the output voltage increases, and the component in the load can work normally. Therefore, the logic control circuit 41 dynamically adjusts the step-up circuit according to the voltage of the battery and the output voltage, so as to ensure that the output voltage is stabilized at a specified target voltage.

In conclusion, in the power supply method provided in this embodiment of the present invention, the voltage of the battery is compared with the first threshold and the second threshold. When the battery is at a medium-high voltage level, power is supplied to the load by using the charging manager. When the battery is at a low voltage level, power is supplied to the load by increasing an output end voltage of the load power supply circuit by using the step-up circuit. In this way, electric power of the battery at a low voltage level can be fully used. Further, when the existing switch element such as the MOS transistor in the charging manager and the step-up circuit form the bypassboost circuit, when the battery is at a medium-high voltage level, the battery supplies power to the load by using the MOS transistor used as a bypass circuit. When the battery is at a low voltage level, the battery supplies power to the load by using the step-up circuit. In the prior art, the voltage of the battery may decrease when the battery is at a high voltage level, or the bypass circuit is disposed inside the battery or in a circuit between the battery and the load. Because the bypass circuit is generally a MOS transistor or an inductor, impedance is generated, thereby reducing system working efficiency, and degrading a loading capability of the battery. However, by comparison, in this application, the existing switch element in the charging manager may be used as the bypass circuit to improve the system working efficiency, so as to improve the loading capability of the battery. In addition, an area of a battery protection board may be reduced to reduce a heating risk of the battery protection board.

In the several embodiments provided in this application, it should be understood that the disclosed device and method may be implemented in other manners. For example, the device embodiment described above is merely an example.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (Read Only Memory, ROM for short), a random access memory (Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A load power supply circuit comprising:
    a charging manager that is integrated into a single circuit chip and that comprises a first pin, a second pin, a third pin, a logic control circuit, and a switch element, wherein:
        the first pin of the charging manager is electrically connected to a load and the second pin of the charging manager is electrically connected to a battery;
        the logic control circuit comprises a first output end and a second output end;
        the switch element is a metal insulator semiconductor (MOS) transistor that comprises a first end, a second end, and a control end, wherein a gate of the MOS transistor is the control end of the switch element, a source of the MOS transistor is the second end of the switch element, and a drain of the MOS transistor is the first end of the switch element;
        the first end of the switch element is electrically connected to the first pin of the charging manager, the second end of the switch element is electrically connected to the second pin of the charging manager, and the control end of the switch element is electrically connected to the first output end of the logic control circuit; and
        the second output end of the logic control circuit is electrically connected to the third pin of the charging manager; and
    a step-up circuit that comprises a first end, a second end, and a control end, the first end of the step-up circuit is electrically connected to the load, the second end of the step-up circuit is electrically connected to the battery, and the control end of the step-up circuit is electrically connected to the third pin of the charging manager; wherein
        when the charging manager is not electrically connected to an external power supply and when a voltage of the battery is greater than a first threshold, the logic control circuit controls the control end of the switch element to connect the first end and the second end of the switch element, the logic control circuit controls the control end of the step-up circuit to disconnect the step-up circuit, and the battery supplies power to the load by using the switch element in the charging manager;
        when the charging manager is not electrically connected to the external power supply and when the voltage of the battery is less than a second threshold, the logic control circuit controls the control end of the switch element to disconnect the first end and the second end of the switch element, the logic control circuit controls the control end of the step-up circuit to connect the step-up circuit, and the battery supplies power to the load by using the step-up circuit, wherein the second threshold is less than or equal to the first threshold; and
        the step-up circuit and the switch element of the charging manager are electrically connected in parallel.

2. The load power supply circuit according to claim 1, wherein when the charging manager is electrically connected to the external power supply, the external power supply supplies power to the load by using the charging manager, the logic control circuit controls the control end of the switch element to connect the first end and the second end of the switch element, and the external power supply charges the battery by using the switch element.

3. The load power supply circuit according to claim 1, wherein when the charging manager is electrically connected to the external power supply and the voltage of the battery is greater than a third threshold, the external power supply supplies power to the load by using the charging manager, and the logic control circuit controls the control end of the switch element to disconnect the first end and the second end of the switch element, wherein the third threshold is greater than the first threshold.

4. The load power supply circuit according to claim 1, wherein the logic control circuit further comprises an input end, and the logic control circuit obtains the voltage of the battery by using the input end.

5. The load power supply circuit according to claim 1, wherein the charging manager and the step-up circuit are integrated into the single circuit chip.

6. A terminal, comprising:
    a load;
    a load power supply circuit that comprises a charging manager and a step-up circuit;
    a battery that supplies power to the load by using the load power supply circuit;
    the charging manager is integrated into a single circuit chip and comprises a first pin, a second pin, a third pin, a logic control circuit, and a switch element, wherein:
        the first pin of the charging manager is electrically connected to the load and the second pin of the charging manager is electrically connected to the battery;
        the logic control circuit comprises a first output end and a second output end;
        the switch element is a metal insulator semiconductor (MOS) transistor that comprises a first end, a second end, and a control end, wherein a gate of the MOS transistor is the control end of the switch element, a source of the MOS transistor is the second end of the switch element, and a drain of the MOS transistor is the first end of the switch element;
        the first end of the switch element is electrically connected to the first pin of the charging manager, the second end of the switch element is electrically connected to the second pin of the charging manager, and the control end of the switch element is electrically connected to the first output end of the logic control circuit; and
        the second output end of the logic control circuit is electrically connected to the third pin of the charging manager; and
    the step-up circuit comprises a first end, a second end, and a control end, the first end of the step-up circuit is electrically connected to the load, the second end of the step-up circuit is electrically connected to the battery, and the control end of the step-up circuit is electrically connected to the third pin of the charging manager; wherein:

when the charging manager is not electrically connected to an external power supply and when a voltage of the battery is greater than a first threshold, the logic control circuit controls the control end of the switch element to connect the first end and the second end of the switch element, the logic control circuit controls the control end of the step-up circuit to disconnect the step-up circuit, and the battery supplies power to the load by using the switch element in the charging manager;

when the charging manager is not electrically connected to the external power supply and when the voltage of the battery is less than a second threshold, the logic control circuit controls the control end of the switch element to disconnect the first end and the second end of the switch element, the logic control circuit controls the control end of the step-up circuit to connect the step-up circuit, and the battery supplies power to the load by using the step-up circuit, wherein the second threshold is less than or equal to the first threshold; and the step-up circuit and the switch element of the charging manager are electrically connected in parallel.

7. The terminal according to claim 6, wherein when the charging manager is electrically connected to the external power supply, the external power supply supplies power to the load by using the charging manager, the logic control circuit controls the control end of the switch element to connect the first end and the second end of the switch element, and the external power supply charges the battery by using the switch element.

8. The terminal according to claim 6, wherein when the charging manager is electrically connected to the external power supply and the voltage of the battery is greater than a third threshold, the external power supply supplies power to the load by using the charging manager, and the logic control circuit controls the control end of the switch element to disconnect the first end and the second end of the switch element, wherein the third threshold is greater than the first threshold.

9. The terminal according to claim 6, wherein the logic control circuit further comprises an input end, and the logic control circuit obtains the voltage of the battery by using the input end.

10. The terminal according to claim 6, wherein the charging manager and the step-up circuit are integrated into the single circuit chip.

* * * * *